United States Patent [19]

Johnson

[11] 3,905,042

[45] Sept. 9, 1975

[54] STENOGRAPHIC REMOTE CONTROL SYSTEM AND APPARATUS

[75] Inventor: Charles C. Johnson, Silver Spring, Md.

[73] Assignee: Business Equipment Center Ltd., Washington, D.C.

[22] Filed: Mar. 23, 1973

[21] Appl. No.: 344,434

[52] U.S. Cl. ........... 360/71; 179/100.1 DR; 360/72; 360/74

[51] Int. Cl. .................. G11b 15/10; G11b 15/20; G11b 19/16

[58] Field of Search 179/100.2 S, 100.2 MD:100.2 B, 179/100.2 K, 100.1 DR, 100.1 R; 35/35 C; 360/71, 72, 74, 31, 62

[56] References Cited

UNITED STATES PATENTS

| | | | |
|---|---|---|---|
| 3,028,454 | 4/1962 | Von Kohorn | 179/100.1 R |
| 3,086,086 | 4/1963 | Ernst et al. | 179/100.4 PT |
| 3,244,816 | 4/1966 | Karns | 35/35 C |
| 3,271,883 | 9/1966 | Freeman | 35/35 C |
| 3,474,455 | 10/1969 | Summers | 179/100.1 DR |
| 3,766,326 | 10/1973 | Buchholz | 179/100.2 DR |

*Primary Examiner*—Alfred H. Eddleman
*Attorney, Agent, or Firm*—John J. Byrne; Edward E. Dyson

[57] ABSTRACT

A remote control unit is used to select between two or more magnetic tape recorders. A stenographic operator wearing a stenographic mask microphone connected to said remote control unit may record on any one of several magnetic tape recorders by simply turning a switch. The remote control unit also includes other recorder functions such as rewind, forward, letter or secretary indexing on a separate medium, audio input, and monitor. With the control unit, a courtroom stenographer may remotely control the functions of his recording devices and has the freedom to reload one while recording into another, without interrupting courtroom proceedings.

1 Claim, 3 Drawing Figures

STENOGRAPHIC REMOTE CONTROL SYSTEM AND APPARATUS

BACKGROUND OF THE INVENTION

1. Field of the Invention

This invention relates generally to stenographic recording equipment.

2. Description of the Prior Art

There are several ways known in the prior art by which courtroom transcripts can be made. One method is to directly transcribe the testimony by stenographic typewriter. This method has certain speed limitations and requires an operator of considerable skill. Another method is to directly record on magnetic tapes the entire proceedings that occur in the courtroom. This method, too, has disadvantages in that poor acoustics may frequently garble or attenuate the information to be recorded. Also, it is difficult to keep the recording machine from recording information that may be considered prejudicial to the jury or otherwise may be undesirable to have appear on the transcript. This is because the recorder will, of course, record everything in the courtroom including background noises.

The development of the stenographic mask technique has greatly improved the ease of taking stenographic transcripts in court. To use a stenographic mask, the stenographic operator simply speaks into the device. A rubber gasket makes a seal between the operator and the instrument and allows the operator to speak into the microphone without being overheard by people nearby. The mask is equipped with a special valve that allows the operator to inhale but which closes when he speaks. The recording device to which the microphone is attached is controlled by a hand switch mounted on the handle of the stenographic mask. In this manner, a stenographer may repeat the testimony into the mask and edit it at the same time. This has several advantages. The first advantage is that the operator may selectively edit the transcript and thereby delete prejudicial material from it. The second advantage is that the speaker need not necessarily be a skilled stenographic secretary.

While the stenographic mask technique has many advantages over the prior art systems, a problem was encountered when the recording device came to the end of its recording medium. At this point, a stenographic operator not equipped with the present system has to stop his recording, take out the old tape, make notes on the old tape, reinsert a new tape, restart the machine, and try to record as quickly as he can all of the proceedings that he missed while his recorder was down. Alternatively, it was necessary for him to ask for a halt in proceedings until he could become operative again. The stenographic remote control system of the present invention relieves the stenographer of this problem in a simple, economical, and efficient manner.

SUMMARY OF THE INVENTION

According to one embodiment of the present invention, two magnetic tape recorders are controlled by a remote control unit which governs the functioning of either machine selectively. A stenographic mask microphone is connected to the remote control unit which in turn is connected to two magnetic tape recorders. All of the machine operations of both magnetic tape recorders can be controlled by the remote control unit.

In operation, a stenographic operator will typically select one of the preloaded two tape recording devices and dictate into it. As the tape comes to an end, the stenographic recorder simply switches the selector switch on the remote control unit and begins recording on the fresh tape of the other recorder. Occasionally, it may be desirable to stop the recording before the end of the tape so that it may be typed up immediately by a waiting secretary. The stenographic operator can easily switch to a loaded machine, unload the partially recorded tape and pass it on for typing. In the meantime, while he is transcribing into one machine, he can reload the other.

There are, of course, devices in other arts for automatically transferring between tape recording machines. Often, a piece of metal or aluminum foil is laminated to the trailing edge of the recording tape and is used to trigger a sensor to accomplish the switching automatically. This technique, of course requires that the stenographic operator wait until the end of the tape and this is frequently undesirable if it is necessary to type a partially completed tape in a hurry.

Gray U.S. Pat. No. 3,109,898 is typical of devices which automatically switch between tapes. However, such automatic units are not intended to meet the requirements of stenographic use. In particular, they are not intended for use with stenographic microphone masks. Moreover, they often have the disadvantage of not allowing the operator to switch between machines before the end of the tape. Also, they are not completely foolproof and for courtroom reporting, more positive systems are desirable.

It is an object of the present invention to allow a stenographic reporter using a microphone mask to select one of a plurality of magnetic tape recorders to receive dictated information.

It is a further object of the present invention to permit a stenographic operator to select between a plurality of magnetic tape recording machines before the end of the magnetic tape on which he is recording.

It is yet another object of the present invention to provide a means for remotely controlling two or more magnetic tape recorders with a remote control unit.

It is a still further object of the present invention to control the rewind, forward, letter and secretary index, audio input and monitoring functions of a plurality of tape recorders from a remote control unit.

These and other objects and advantages of the invention will be more fully understood upon a reading of the following specification taken in view of the attached drawings.

DETAILED DESCRIPTION

Figure 1:
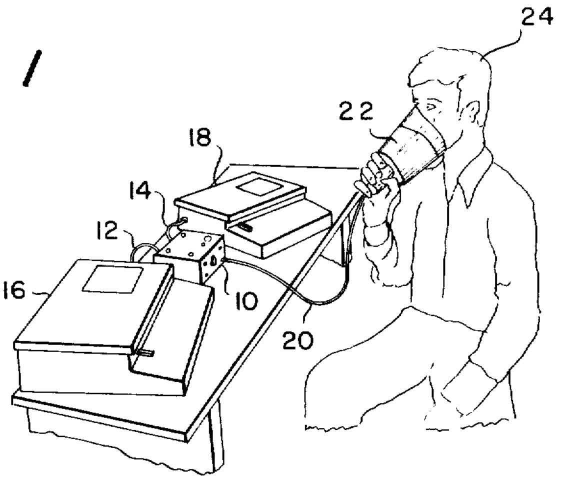
FIG. 1 is a general schematic diagram of all of the components of the instant stenographic remote control system as employed by a stenographic operator.

FIG. 1 is a general schematic diagram of the whole stenographic remote control system. A remote control unit 10 is connected via a set of cables 12 and 14 to a pair of magnetic tape recorders 16 and 18, respectively. The remote control unit 10 is also connected via line 20 to a stenographic mask microphone 22. A stenographic operator 24 is seated before the tape recorder system and verbally makes his notes into the stenographic microphone mask 22. The Sony Model BM-30 Secutive Dictating Machine has been found to be wholly satisfactory in such a system.

Figure 2:
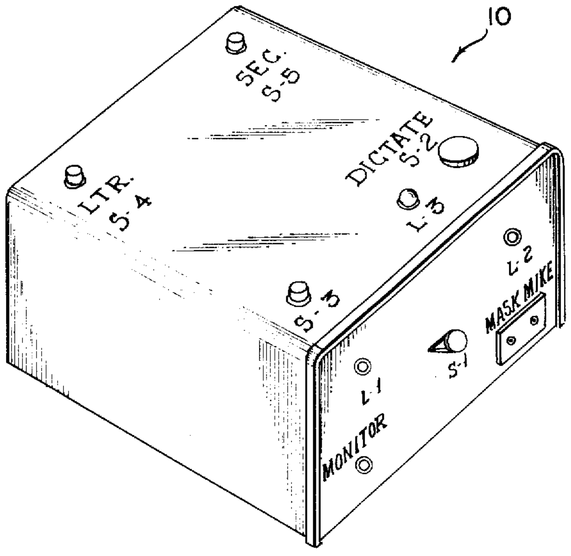
FIG. 2 is a perspective view of the remote control unit.

FIG. 2 is a perspective view of the remote control unit 10 as seen in FIG. 1. The cabinet of the remote control unit 10 is a standard electronic component box including switches for selecting different functions from the recording devices. The main control of the remote control unit 10 is selector switch S–1 which is used to choose either magnetic tape recorder 16 or magnetic tape recorder 18 as shown in FIG. 1. Two lights, L–1 and L–2, respectively, are used to indicate which magnetic tape recorder, 16 or 18, is active. The front panel also includes three jack connections J–1, J–2, and J–3. J–1 is the direct connection to the mask microphone and J–2 is connected to the hand control of the stenographic mask microphone 33. In one embodiment both male elements are mounted on the same plug body. J–1 and J–2 are shown as being female but, of course, could be male, if it were so desired. In a like manner, J–3 is a female jack for connection to a pair of ear phones so that the information on the tape recorder may be monitored by the stenographic operator.

The top surface of the remote control unit 10 includes switches S–2, S–3, S–4, and S–5 and a dictate lamp L–3. Switch S–2 controls the dictate function which, when turned on, illuminates lamp L–3. S–5 is the rewind and forward switch for controlling the tape direction of either magnetic tape recorder 16 or 18. Switches S–4 and S–5 are the letter index and secretary index switches, respectively. They both serve similar functions in that they indicate on a separate medium, usually a strip of paper, where a letter ends or where a secretary should stop on some portion of the reel.

In the Sony BM-30, the secretary and letter indexing information is carried on a second channel of the cassette tape and is imprinted on the upper and lower portions of the indexing record paper.

Figure 3:
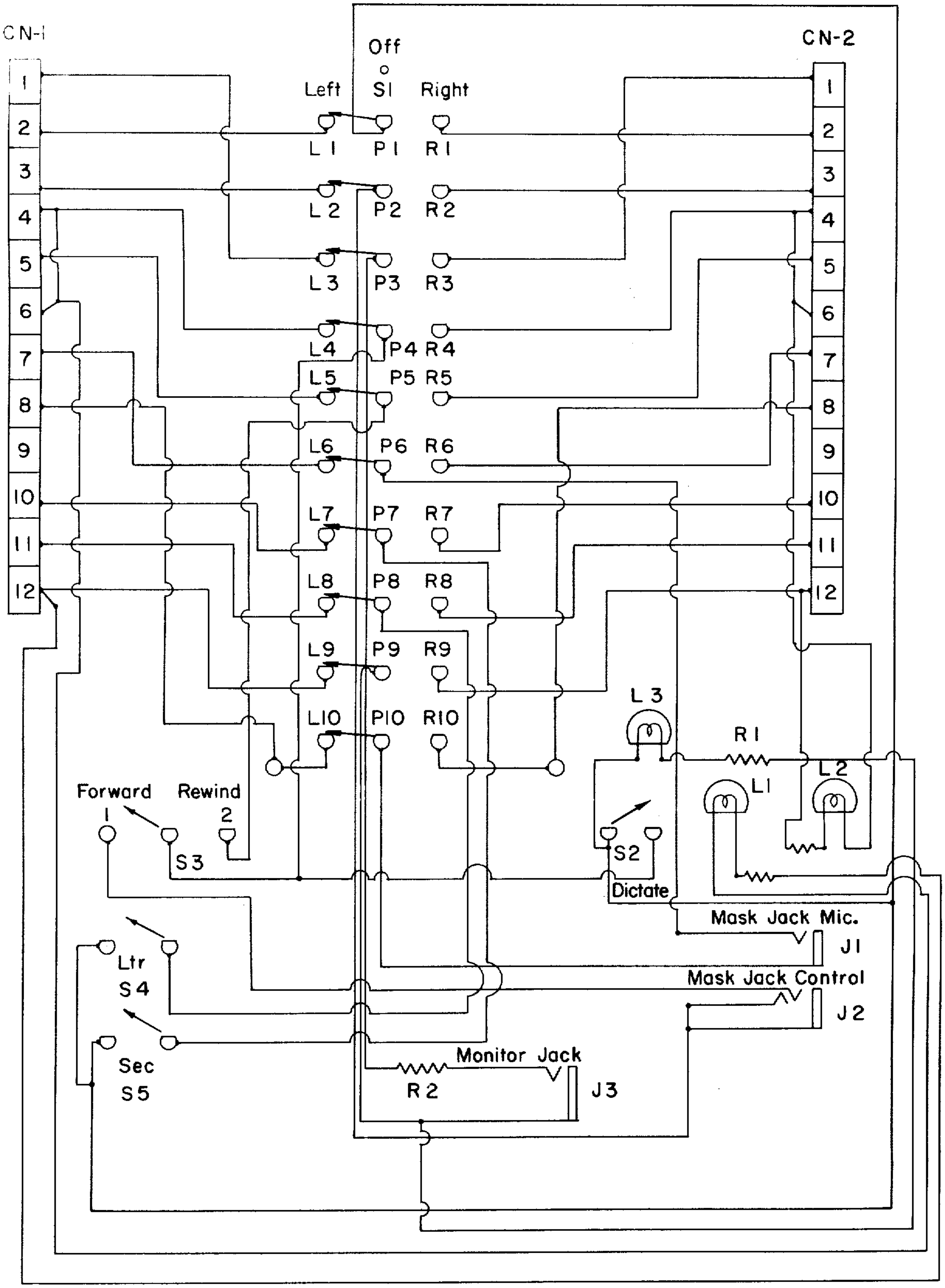
FIG. 3 is an electrical schematic diagram of the components associated with the remote control unit of FIG. 2.

FIG. 3 is an electronic schematic of the interconnection of the components in the remote control unit 10. Selector switch S–1 is shown as being a ten-pole, double-throw switch. In one embodiment, a twelve-pole, four position, non-shorting rotary switch was used but only two positions and ten poles of that switch were incorporated into the circuit. Each pole of switch S–1 is associated with a right and left contact designated as R and L.

A twelve pin plug and cable is connectable to a Sony BM-30 Secutive Dictating Machine. By selectively connecting certain pins to each other, the functions of magnetic tape recorders 16 and 18 may be controlled. The left connecting cable and plug is designated as CN–1 and is connectable to tape recorder 16. The right connecting cable and plug is designated as CN–2 and is connectable to tape recorder 18. Of course, the Sony BM-30 was chosen for purposes of illustration only and similar contacts can be made to other types of office dictating equipment.

The connections between left connecting cable and plug CN–1 and contacts of switch S–1 are as follows:

| CN-1 Plug Connection | | S-1 Left Contact Connection |
|---|---|---|
| CN-1 contact 1 | to | S-1 left contact 3 |
| CN-1 contact 2 | to | S-1 left contact 1 |
| CN-1 contact 3 | to | S-1 left contact 2 |
| CN-1 contact 4 | to | S-1 left contact 4 and to CN-1 contact 6 |
| CN-1 contact 5 | to | S-1 left contact 5 |
| CN-1 contact 6 | to | CN-1 contact 4 and to lamp LA-1 |
| CN-1 contact 7 | to | S-1 left contact 6 |
| CN-1 contact 8 | to | S-1 left contact 10 |
| CN-1 contact 9 | — | no contact |
| CN-1 contact 10 | to | S-1 left contact 7 |
| CN-1 contact 11 | to | CN-1 left contact 8 |
| CN-1 contact 12 | to | S-1 left contact 9 |

Likewise, the contacts of the right connecting cable and plug CN–2 are the following:

| CN-2 Plug Connection | | S-1 Right Contacts |
|---|---|---|
| CN-2 contact 1 | to | S-1 right contact 3 |
| CN-2 contact 2 | to | S-1 right contact 1 |
| CN-2 contact 3 | to | S-1 right contact 2 |
| CN-2 contact 4 | to | S-1 right contact 4 and to CN-2 contact 6 |
| CN-2 contact 5 | to | S-1 right contact 5 |
| CN-2 contact 6 | to | CN-2 contact 4 and LA-2 |
| CN-2 contact 7 | to | S-1 right contact 6 |
| CN-2 contact 8 | to | S-1 right contact 10 |
| CN-2 contact 9 | — | no contact |
| CN-2 contact 10 | to | S-1 right contact 7 |
| CN-2 contact 11 | to | S-1 right contact 8 |
| CN-2 contact 12 | to | S-1 right contact 9 |

Rewind switch S–3 is a single-pole, double-throw switch with a first and second contact selectively connectable to the pole. The pole of S–3 is connected directly to the fourth pole P–4 of S–1 and to dictate switch S–2. Contact 2 of S–3 is connected to P–5 of S–1 and contact 1 of S–3 is connected to jack J–2. The other pole of jack J–2 is connected to the second pole P–2 of S–1. Mask microphone jack J–1 is connected across poles P–6 and P–10 of S–1. Monitor jack J–3 is connected across poles P–3 and P–9 of S–1 with a 33 ohm resistor R–2 in series with J–3 and P–3. Letter and secretary indexing switches S–4 and S–5 are single-pole, single-throw switches. The pole of letter index switch S–4 is connected to pole P–8 of S–1 and the pole of secretary index switch S–5 is connected to pole P–7 of S–1. The contacts of S–4 and S–5 are connected together and to pole P–1 of switch S–1. The pole of dictate switch S–2 is also connected to pole P–1 of S–1 and to lamp L–3.

The other contact of dictate lamp L–3 is connected through a 200 ohm resistor R–1 to one contact of J–3 and also to pole P–9 of S–1.

Lamp L–1 is lit whenever selector switch S–1 is thrown to engage left contacts L–1 through L–10. Lamp L–1 is connected through a 220 ohm resistor R–3, across contacts 12 and jumpered contacts 4 and 6 of CN–1. Likewise, indicator lamp L–2 is connected through another 220 ohm resistor R–4 across contacts 12 and jumpered contacts 4 and 6 of CN–2.

It should be clear that the plug contacts CN–1 and CN–2 reflect the particular equipment used and that other office dictating equipment with different contacts may have to be wired in a different manner to switch S–1. In the Sony BM-30 the following contacts are associated with the following functions.

Terminals of CN-1 and CN-2

1. Playback
2. Record, Secretary and Letter Index
3. Forward Control
4. Record, Forward Control, and Reverse
5. Reverse
6. Record, Forward Control, and Reverse
7. Audio In
8. Audio In
9. Not used
10. Secretary Index
11. Letter Index
12. Playback and Common for Light The operation of the stenographic remote control system is as follows. For purposes of illustration only, it is presumed that switch S–1 has been thrown so that poles P–1 through P–10 engage left contacts L–1 through L–10, respectively.

The rewinding of either magnetic tape recorder is controlled by switch S–3. When the pole of S–3 is thrown against contact 2 the circuit between poles P–4 and P–5 of S–1 is completed. With pole P–4 thrown against contact L–4 and P–5 thrown against contact L–5 a complete circuit is formed between contacts 4 and 5 of CN–1 and the associated magnetic tape recorder, in this case 16, caused to perform its rewind function.

The end of letter indexing (LTR) and the secretary note indexing (SEC) are accomplished in similar manner. When LTR switch S–4 is closed a circuit is complete between poles P–1 and P–8 of S–1. With P–1 thrown against L–1 and P–8 thrown against L–8, the circuit is therefore complete to contacts 11 and 2 of CN–1 and a mark is made on the indexing record medium. In a similar manner, when the SEC index switch S–5 is closed a circuit is completed between poles P–1 and P–7 of S–1. With P–1 in contact with L–1 and P–7 in contact with L–7, the circuit is therefore complete through contacts 2 and 10 of CN–1 which controls the secretary note indexing function of magnetic tape recorder 16. This causes an index mark to be made on the index recording medium.

The recording function is accomplished by the closing of dicate switch S–2. This completes a circuit between poles P–4 and P–1 of S–1 and via those poles between contacts 1 and 4 of CN–1. The application of power to this circuit also lights lamp L–3 which indicates that one of the machines is activated to take dictation. Resistor R–1, like Resistors R–2, R–3, and R–4, serves to limit the current flowing through their associated circuitry and thereby helps to promote longer life.

Forward transport control of the tape is accomplished through the closing of the microphone switch on the stenographic mask which in turn closes the circuit across jack J–2. When switch S–3 is thrown with the pole across contact 1 a circuit is completed between poles P–2 and P–4 of S–1. With pole P–2 in contact with L–2 and P–4 in contact with L–4 the circuit is completed between contacts 3 and 4 and 6 of CN–1.

The monitoring of information on magnetic tape recorder 16 is accomplished by inserting a male plug into the female monitor jack J–3. This closes a circuit between poles 3 and 9 and therefore between contacts 1 and 12 of CN–1. By inserting an earphone plug into the monitor jack J–3 the stenographic operator can monitor the information that he has recorded.

The microphone plug of the stenographic microphone mask 22 is inserted in female receptacle J–1. This completes a circuit through poles P–6 and P–10 of S–1 which in turn connects to contacts 7 and 8 of CN–1 when S–1 is thrown to engage contacts L–1 and L–10. In this manner, the microphone is always connected to the audio input of CN–1 but no recording takes place until the control switch on the stenographic microphone mask 22 is closed and the rewind switch S–3 in the forward position so as to cause the magnetic tape to pass by the recording head.

The following is a parts list of the components incorporated in the remote control unit:

| Part | Description |
|---|---|
| CN-1 and CN-2 | Connecting cable and plug assembly |
| S-1 | Twelve-pole, four-position, non-shorting rotary switch. Part No. T-237, International Resistance Corporation |
| S-2 | Single-pole, single-throw, momentary contact pushbutton switch. Manufacturer - Hydrometals, Inc. Part No. 96-0324 |
| S-3 | Single-pole, double-throw, make-break pushbutton switch. Manufacturer - Switchcraft, Inc. Part No. 913 |
| S-4 and S-5 | Single-pole, single-throw momentary contact pushbutton switch. Manufacturer - Hydrometals Inc. Calectro Part No. E2-140. |
| J-1 and J-3 | Miniature panel mounting jacks closed circuit 2-conductor. Manufacturer - GC Electronics. Part No. 32-722 |
| J-2 | Subminiature panel mounting jack closed circuit 2-conductor. Manufacturer - National Tel-Tronics Corporation. Part No. 311 |
| R-1, R-3, R-4 | Resistors 220 ohm, 1/2 watt. Manufacturer - Ohm-Mite Manufacturing Corp. |
| R-2 | 33 ohm, 1/2 watt. Manufacturer - Ohm-Mite Manufacturing Corp. |
| L-1, L-2, L-3 | Panel lamp 9.3 volts. Manufacturer - Sony. Part No. 1-518-251. |
| Cabinet | Manufacturer - LMB Corporation. Part No. 463 |

While a specific embodiment of the present invention has been discussed above it will be obvious to those of ordinary skill in the art that many modifications can be made without departing from the spirit of the invention and the accompanying claims.

For instance, it is clearly obvious that other kinds of recording equipment may be used in conjunction with the disclosed stenographic remote control system. Where equipment is employed in which a different arrangement of output pins is used then it would be obvious to rearrange the connections of S–1 to the connecting cables so that the correct machine functions will be associated with the correct poles of S–1. It should also be obvious that magnetic tape is not the only medium which can be employed for recording. For instance, magnetic belts or embossed plastic belts or the like could also be satisfactory. Similarly, a switch having more than 10 poles and more than two throw positions can be used and, of course, it would be obvious to delete poles if it were desired to reduce the number of functions performable by the remote control unit.

In a general manner, while there have been disclosed effective and efficient embodiments of the invention it should be well understood that the invention is not limited to such embodiments as there might be changes made in the arrangement, disposition, and form of the parts without departing from the principle of the present invention comprehended with the scope of the accompanying claims.

I claim:

1. In a system for recording the words of speakers wherein the system includes first and second recording units of a type including control means to move their respective recording mediums forward during a record mode, to reverse wind, playback, to start and stop, that improvement comprising a stenographic face mask microphone into which an operator can speak without disturbing those in the vicinity and which speech develops an electrical output, second control means on said face mask adapted to control said control means, a first electrical conduit for transmitting the electrical output from said microphone, a second electrical conduit for transmitting signals from said second control means, a portable control unit having input terminals for receiving said first and second conduits, first and second output terminals leading from said control unit, first and second circuitries for electrically and respectively connecting said first and second recorder units to said first and second output terminals, and switch means on said portable control unit for selectively and alternatively connecting the inputs from said first and second conduits to said first circuitry or said second circuitry.

* * * * *